Figure 1:
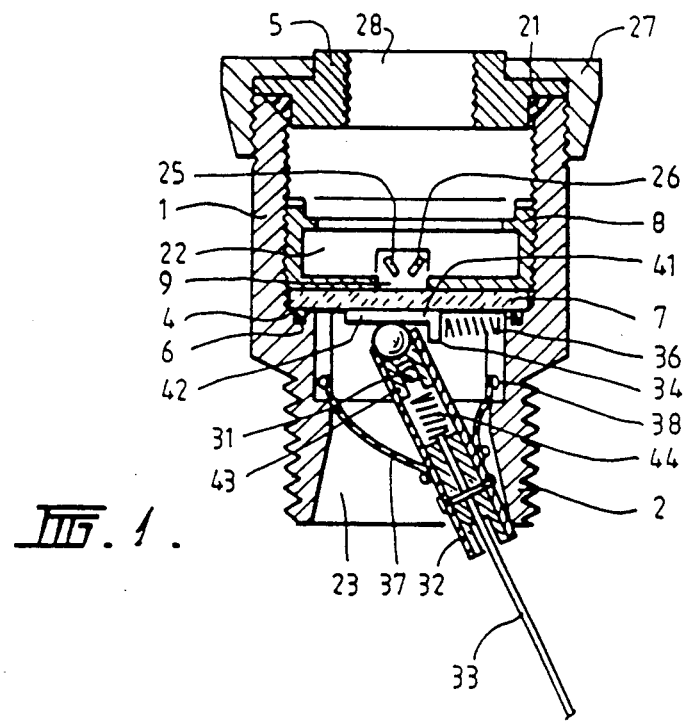

United States Patent [19]

Farrell et al.

[11] Patent Number: 5,049,860
[45] Date of Patent: Sep. 17, 1991

[54] TWO WIRE FLOW CONDITION SENSING SYSTEM

[76] Inventors: Jonathon E. Farrell; Mark C. Anthony, both of 8 Chomley Street, Cranbourne, Victoria, Australia, 3977

[21] Appl. No.: 496,662

[22] Filed: Mar. 21, 1990

Related U.S. Application Data

[63] Continuation of Ser. No. 123,678, Nov. 23, 1987, Pat. No. 4,945,344.

[30] Foreign Application Priority Data

Nov. 24, 1986 [AU] Australia ............... PH9156

[51] Int. Cl.⁵ ............................................. G08B 21/00
[52] U.S. Cl. ..................... 340/610; 340/611; 73/861.74; 73/DIG. 11; 250/231.1
[58] Field of Search ............. 340/610, 611, 600; 73/861.74, 861.75, 861.76, DIG. 11; 250/221, 222.1, 231.10, 231.19

[56] References Cited

U.S. PATENT DOCUMENTS

| | | | |
|---|---|---|---|
| 1,967,018 | 7/1934 | Bohner | 340/610 |
| 3,882,477 | 5/1975 | Mueller | 340/600 |
| 4,295,044 | 10/1981 | Anderson et al. | 73/861.74 |
| 4,367,736 | 1/1983 | Gupton | 340/632 |
| 4,727,886 | 3/1988 | Conrardy et al. | 73/861.74 |
| 4,789,778 | 12/1988 | Layh | 250/221 |

FOREIGN PATENT DOCUMENTS 0019915 3/1972 Australia .
2554242 3/1985 France .

Primary Examiner—Joseph A. Orsino
Assistant Examiner—Jill Jackson
Attorney, Agent, or Firm—Andrus, Sceales, Starke & Sawall

[57] ABSTRACT

A flow sensor for detecting the absence of a minimum fluid flow in a sprinkler system. The fluid acts upon a vane positioned in the fluid path. Movement of the vane controls the position of a slider. The slider's surface has reflective and non-reflective ends which, in response to the vane's movement, reflect or absorb light from a light emission and detection means. The voltages from the light emission and detection means are monitored for indications of the fluid flow. The sensor uses a two wire signal transmitting system.

4 Claims, 1 Drawing Sheet

TWO WIRE FLOW CONDITION SENSING SYSTEM

The present application is a continuation application of U.S. patent application Ser. No. 07/123,678, filed Nov. 23, 1987, now U.S. Pat. No. 4,945,344.

This invention relates to a flow sensor.

In a particular aspect this invention relates to sensing water flow in pipes associated with a building fire sprinkler system. However, the flow sensor of the present invention has other applications such as in respect of oil refineries, gas plants and pumping systems.

Building fire sprinkler systems usually comprise a main pipe which feeds to sub-main pipes which in turn feed to individual sprinkler pipes. It is known to place flow sensor devices at least in each sub-main pipe and also in each individual sprinkler pipe.

A known flow sensor includes a paddle which, when moved by water flowing in an associated sprinkler pipe, will move a mechanical switch to complete an electrical circuit.

For reasons of safety, it is not considered satisfactory that a known sensor should close a switch in a two wire system consisting of a power supply wire and a return wire as any break in either of the wires or in an associated connection would render the closing of the switch ineffective.

Instead, a three wire system is used in which two wires are respectively a power supply and return wires and the third wire is a signal carry wire through which current passes when the switch is closed. A load resistor is located adjacent the sensor and a small current is continually passed through the supply and return wires. The three wires run to a remote monitor panel where current sensor means is located and adapted to give an alarm in the event that current flow in the supply and return wires exceeds a first value (as may occur in a short circuit) or falls below a second value (as may occur in an open circuit). Other current sensor means is adapted to give a signal if current flows in the signal carry wire.

It is particularly to be noted that whilst the integrity of the supply and return wires is continually monitored, the integrity of the signal carry wire is not continually monitored. This last is considered by the present inventors to be an unsafe practice.

Further, since three wires must be run from each sensor to the control panel there is substantial cabling expense.

Further, the known sensor utilizing a mechanical switch is considered by the present inventors to be unsatisfactory.

It is one object of the present invention to produce a flow sensor for use in a two wire system. However, it is also another object of this invention to produce a flow sensor having other features and which could be used in a conventional three wire system.

The present invention provides:
a flow sensor comprising a body,
a partition dividing the body into first and second ends, the partition being fluid tight and being or comprising a window, light emission means located in the first end and adapted to transmit light through the window towards the second end, a surface having a substantially light reflective portion and a substantially light unreflective portion located in the second end and adapted to be moved between first and second positions with respect to the window in which it will, respectively, substantially reflect light from the light emission means back through the window towards the first end and substantially not reflect light back through said window towards the first end,
a light detector means located in the first end and adapted to produce an output signal when receiving light reflected through said window towards the first end by said surface when in the first position, wherein the second end is adatped to be connected to a pipe or other structure within which fluid may flow and mechanical means movable in use by fluid flowing in said pipe or other structure and operative when so moved to move said surface from said second position to said first position.

Preferably said surface and said window are so closely spaced or said surface carries wiping means adapted to contact the window such that said surface or said wiping means will produce a cleaning wiping effect on said window in being moved from the second position to the first position.

The mechanical means is preferably a vane mounted to pivot about an axis.

The mechanical means is preferably enclosed by a sealing member such as a flexible boot such as of rubber.

Said surface is preferably silvered in one region to be reflective in that region and black in another region so as not to be reflective in that region.

The sensor of the present invention may be used in a flow sensor system such as a three wire building fire sprinkler alarm system and in this respect the light emission means may be connected to current supply and return wires and the light detector means may be connected to a third, signal carry wire.

However, as is preferred, the sensor of the present invention may be used in a two wire flow sensor system such as a building fire sprinkler alarm system in which the two wires are used as current supply and return wires and as a signal carrier.

In this respect, if the sensor of the present invention is to continuously monitor, as is usual although intermittent monitoring is possible, the light emission means may be connected across current supply and return wires. In this condition, a cable monitoring end of line resistor may be omitted if desired as the light emission means will inter alia act as that resistor. However, the end of line resistor may be maintained if desired. In this condition if the light emission means should fail and go open circuit, the resistance in the system will change and this can be detected at a remote monitor means; if the light emission means should fail and go to short circuit, the resistance in the system will also change and this too can be detected.

The output from the light detector means can be connected to either of the current supply and return wires and when outputting will alter the resistance of the system which again can be remotely detected.

Such changes in resistance may be detected by voltage or current monitor means.

Accordingly, the present invention also provides a two wire building fire sprinkler alarm system incorporating a sensor in accordance with this invention.

The present invention also provides a flow sensor having a light emission means and a light detector means and constructed and arranged such that on a predetermined flow condition occurring light from the light emission means will be detected by the light detector means, and including first and second circuit elements effective in use as current supply and return means and as a signal carrier and wherein the light emission means is connected across the current supply and return means and constructed and arranged such that if the light emission means should fail and go open circuit, the resistance of the sensor will change; if the light emission means should fail and go to short circuit, the resistance of the sensor will change and such that the output from the light detector means can be applied to either of the current supply and return means and when outputting the resistance of the sensor will change.

The present invention also provides a flow sheet sensor system incorporating a flow sensor having a light emission means and a light detector means and constructed and arranged such that on a predetermined flow condition occurring light from the light emission means will be detected by the light detector means, the system including first and second circuit elements to be used as current supply and return means and as a signal carrier and wherein the light emission means is connected across the current supply and return means and constructed and arranged such that if the light emission means should fail and go open circuit, the resistance in the system will change such as to be detectable at a remote monitor means; if the light emission means should fail and go to short circuit, the resistance in the system will change such as to be detectable at said monitor means and such that the output from the light detector means can be connected to either of the current supply and return means and when outputting will alter the resistance of the system such as to be remotely detectable at said monitor means.

Another problem of the known sensor discussed above is a tendency to give false alarm signal due to fluctuations in mains pressure, water hammer or during testing.

Accordingly, it is preferred that circuit means be associated with the sensor which is adapted to delay outputting of an output unless a condition initiating an output signal is maintained for not less than a predetermined period of time.

In this last instance it is preferred that output from the light detector means be directed to a timing circuit which will only produce an output for signaling purposes if the output from the light detector means is maintained for more than said period of time.

As well as an ability to give a signal to a remote control panel it is also desirable that the sensor of this invention be adapted to give, at or adjacent the sensor, a visually or audibly perceivable signal of the fact that it is giving such a signal to the panel.

This last will be found to be useful when a serviceman or like is adjacent the sensors and remote from the panel in quickly detecting which one of many sensors is outputting.

Figure 2:
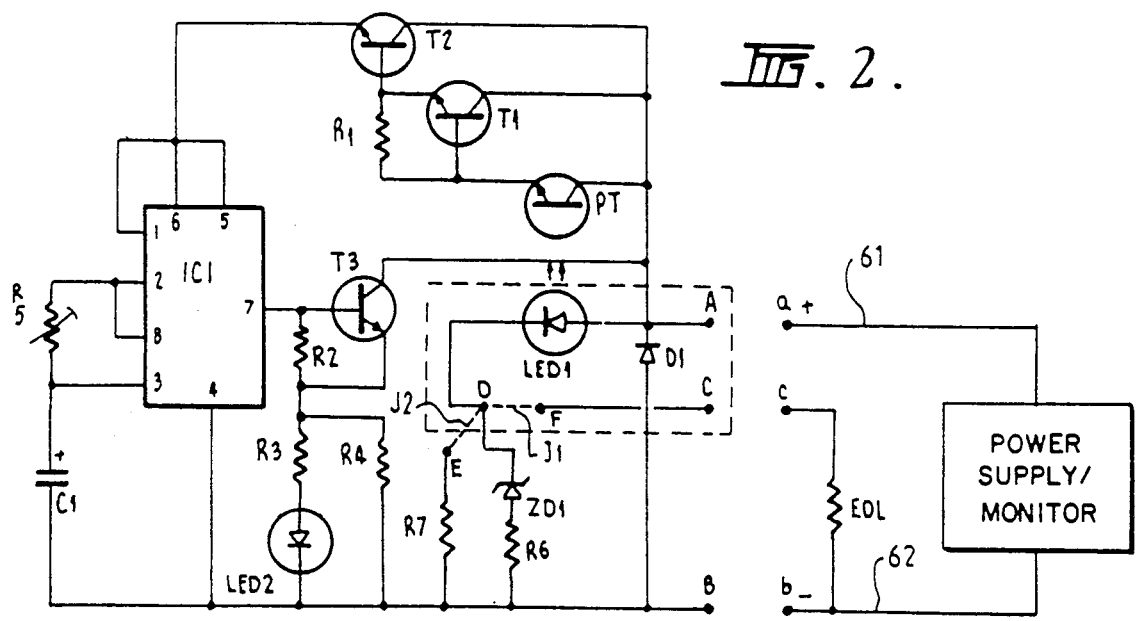

A specific construction of a fluid flow sensor in accordance with this invention will now be described with the aid of the accompanying drawings in which:

FIG. 1 is a cross-sectional view of the sensor, and
FIG. 2 is a circuit diagram of circuitry of the sensor.

The sensor shown in FIG. 1 comprises a metal body 1 having a screw threaded end 2 whereby it may be connected to a pipe through which fluid may be expected to flow.

Within the body 1 is a shoulder 4 carrying an O-ring seal 6 and supporting a transparent sheet 7 of plastics material. A screw threaded member 8 having an aperture 9 is screwed into the body 1 and partitions the body into a first end 22 and a second end 23.

Various electronics are located in the first end 22 and inter alia comprise a light emitter 25 and a light detector 26. The first end is closed by a screw threaded cap 27 which bears on a body 5 having a sealable hole 28 through which a twin cable may pass. An O-ring seal 21 is provided.

The second end (23) includes a flow detector mechanism comprising a pivot axis 31, an arm 32 mounted to pivot on the pivot axis 31, a vane 33 at one end of the arm 32 and a slider 34 adapted to be moved by the arm 32.

A rubber boot 37 held by split circular clip 38 will help to keep dirt out. Alternative seals to the boot 37 may be provided.

The slider 34 is black at its end 41 to be non-reflective and silvered at its end 42 to be reflective.

The slider 34 and arm 32 are biased to the positions shown in FIG. 1 by a spring 36. Further the slider is biased towards contact with the sheet 7 by a spring 44 which acts on a ball carrier 43. Movement of the slider 34 will tend to wipe clean the sheet 7.

In use, fluid in flowing will act on the vane 33 to move the arm 32 to move the slider 34 such that instead of the black end 41 being in a postion adjacent the aperture 9 the silvered end 42 will be in a position adjacent the aperture 9. In the latter position but not in the former position light from the emitter 25 will be reflected by the silvered end 42 to the detector 26.

Reference is now made of FIG. 2.

The circuit of FIG. 2 is a sensor circuit located within the sensor body 1 and is to be connected to wires 61 and 62 of a two wire system in a building fire sprinkler alarm system. The wire 61 is a nominal positive, the wire 62 is a nominal negative, an end of line resistor (EOL) is provided and terminals a, b and c are provided for connection to terminals A, B and C of the sensor circuit.

The sensor circuit comprises an LED1 an infrared light emitting diode which is the light emitter 25 and a protective diode D1 which will protect against reverse polarity. Further, in the event of a reverse polarity connection, the diode D1 will short circuit and this will cause a detectable current flow in the wires 61 and 62. In addition, a voltage limiting zener diode ZD1 and a voltage limiting resistor are provided to limit current flow. A jumper J1 is normally positioned to connect terminals D and F.

Under normal conditions without flow of water in a pipe with which the sensor is associated only LED1 will be energised and thus current flow will be small. It will thus be realized that current flow to check the integrity of the wires 61 and 62 through the EOL resistor will also drive LED1 and, further, if LED1 should fail by going open circuit or short circuit then current flow will change in a way which can be detected.

Under normal conditions, light from LED1 will be incident on black end 41 and not be reflected but if the slider 34 has been moved by the arm 32 in consequence of water flow light will be reflected from silvered end 42 onto PT a phototransistor which is the light detector 26.

When light strikes PT it becomes conducting and via transistors T1 and T2 there is amplification of the current flow in PT. Resistor R1 provides negative feedback to reduce gain.

The output of T2 is connected as an input signal to, and power source for, IC1 which is a 3905 precision timer. Thus, prior to T2 output, which is dependant on PT conducting, the timer IC1 is not energised and is consuming no current.

R5 is a variable resistor and C1 is a capacitor which together form a RC timing circuit. By adjustment of R5 the timing is varied.

Provided that output from PT and hence T2 is maintained for more than the time period set by R5 and C1, the IC1 will output at terminal 7 to transistor T3. If, however, PT should cease outputting before that time period has elapsed, as might be the event in a potential false alarm condition, no output to T3 will occur and thus false alarms are unlikely.

Output from T3 passes via a current limiting resistor R3 to LED2 which is a light emitting diode. This may be omitted but is usefully mounted outside or to be viewable from outside the sensor body 1 to give a visual indication that the particular sensor is outputting. This last is desirable as in a large building with many such sensors the fact that a remote control panel is indicating that a particular sensor is outputting is of little help to a serviceman who is not adjacent that remote control panel but is adjacent to a number of sensors and is uncertain as to which of them is outputting.

Output from T3 also passes through current limiting resistor R4, terminals B and b and wire 62 to give a detectable current flow at the remote monitor panel.

Resistor R2 will allow the timer IC1 to reset after testing.

The above described flow sensor and its circuit will find good application in building fire sprinkler alarm systems and also in other applications of fluid flow monitoring.

With jumper J1 connecting terminals D and F the flow sensor will be able to act as a supervising monitor in which its own circuit is also supervised.

However, if jumper J1 is removed and in lieu a jumper J2 is used to connect terminals D and E then the circuit is no longer monitored but the sensor can be used to directly control a relay or other switching device for giving a signal or operating means which as might be required in an airconditioning plant and in this instance resistor R7 serves as a current limiting resistor for LED1.

In a modification, a coil spring mounted on the axis 31 is used in lieu of the spring 36.

The claims form part of the disclosure of this specification.

Since modifications within the spirit and scope of the invention may be readily effected by persons skilled in the art, it is to be understood that the invention is not limited to the particular embodiment described, by way of example, hereinabove.

We claim:

1. A flow sensor system comprising:
   a flow sensor having a light emission means and a light detector means and constructed and arranged such that when a predetermined flow condition occurs at the sensor, light emanating from the light emission means will be detected by the light detector means, said light detector means having an output,
   first and second circuit elements comprising current supply means and current return means, respectively, for said flow sensor, and
   remote monitor means coupled to said first and second circuit elements for sensing electrical conditions existing in said first and second circuit elements to determine changes in the resistance of the flow sensor,
   the light emission means being connected across said first and second circuit elements and constructed and arranged such that if the light emission means should fail and go open circuit, the resistance of the flow sensor will change such as to be detectable at said monitor means to indicate a fault in the sensor, if the light emission means should fail and go to short circuit, the resistance of the flow sensor will change such as to be detectable at said monitor means to indicate an alarm condition and, said output of the light detector means being connected across said first and second elements for altering the resistance of the flow detector responsive to the detection of light by said light detector means such as to be detectable at said monitor means to indicate the occurrence of the predetermined flow condition.

2. A flow sensor system as claimed in claim 1 having means adapted to give, at or adjacent said flow sensor, a perceivable signal indicative of the occurrence of a changed resistance in said flow sensor.

3. A flow sensor system according to claim 1, including circuit means for preventing alteration of the flow sensor resistance by the light detector means unless said predetermined flow condition occurs for more than a predetermined period of time.

4. A flow sensor system according to claim 3 wherein said circuit means includes a timing circuit for preventing alteration of the resistance of the flow sensor unless said predetermined flow condition occurs for more than a predetermined period of time.

* * * * *